United States Patent
Bae et al.

(10) Patent No.: US 8,464,285 B2
(45) Date of Patent: Jun. 11, 2013

(54) SYSTEM AND METHOD FOR DIGITAL RIGHTS MANAGEMENT OF DIGITAL VIDEO BROADCASTING

(75) Inventors: Young-Kyu Bae, Bucheon-si (KR);
Young-Jip Kim, Suwon-si (KR);
Byoung-Dai Lee, Seongnam-si (KR);
Hyun-Chul Kim, Suwon-si (KR);
Sun-Mi Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 962 days.

(21) Appl. No.: 12/212,379

(22) Filed: Sep. 17, 2008

(65) Prior Publication Data

US 2009/0083786 A1    Mar. 26, 2009

(30) Foreign Application Priority Data

Sep. 21, 2007  (KR) .......................... 10-2007-0096675

(51) Int. Cl.
*H04N 7/16*       (2011.01)
*H04N 7/167*      (2011.01)

(52) U.S. Cl.
USPC ............................................ 725/25; 725/31

(58) Field of Classification Search
USPC ...................................................... 725/25, 31
See application file for complete search history.

(56) References Cited

U.S. PATENT DOCUMENTS

| 2005/0097595 A1* | 5/2005 | Lipsanen et al. ................. 725/25 |
| 2005/0100167 A1* | 5/2005 | Alve et al. ...................... 380/277 |
| 2006/0008088 A1* | 1/2006 | Saarikivi et al. .............. 380/277 |
| 2007/0189535 A1* | 8/2007 | Lee et al. ....................... 380/255 |
| 2008/0065548 A1* | 3/2008 | Muijen ............................ 705/51 |
| 2009/0041242 A1  | 2/2009 | Yang et al. |

FOREIGN PATENT DOCUMENTS

| CN | 1859414 | 11/2006 |
| CN | 101019370 | 8/2007 |
| EP | 1 530 115 | 5/2005 |
| WO | WO 2006/027749 | 3/2006 |

\* cited by examiner

*Primary Examiner* — Pankaj Kumar
*Assistant Examiner* — Franklin Andramuno
(74) *Attorney, Agent, or Firm* — The Farrell Law Firm, P.C.

(57) ABSTRACT

A system and method for Digital Right Management (DRM) of Digital Video Broadcasting (DVB). The system for DRM of DVB includes a DVB transmitting device for transmitting content for the DVB and information on user's rights object for the content, and a DVB receiving device for receiving and storing the transmitted content, and playing the stored data in accordance with the information on the user's rights object. A sneak post view problem occurring during the DVB is solved, and thus the digital rights for the DVB content are efficiently protected. In solving the sneak post view problem, the existing rights object and the construction of the security association database can be used, without adding a separate construction.

18 Claims, 2 Drawing Sheets

SYSTEM AND METHOD FOR DIGITAL RIGHTS MANAGEMENT OF DIGITAL VIDEO BROADCASTING

PRIORITY

This application claims priority to an application entitled "System And Method For Digital Rights Management Of Digital Video Broadcasting," filed in the Korean Industrial Property Office on Sep. 21, 2007, and assigned Serial No. 2007-96675, the contents of which are hereby incorporated by reference.

BACKGROUND OF THE INVENTION

1. Field of the Invention

The present invention relates generally to a system and method for Digital Rights Management (DRM) of Digital Video Broadcasting (DVB). More particularly, the present invention relates to DRM of DVB technology among the Open Mobile Alliance (OMA) Broadcasting (OMA-BCAST) standards by OMA, i.e., a Rights Object (RO) in accordance with content purchase.

The DVB technology related to the OMA-BCAST standards is classified into Digital Video Broadcasting-Handheld (DVB-H) applied to a portable receiving terminal, Digital Video Broadcasting-Cable (DVB-C) applied to a cable receiving terminal, Digital Video Broadcasting-Satellite (DVB-S) applied to digital video broadcasting by a satellite, Digital Video Broadcasting-Terrestrial (DVB-T) applied to digital video broadcasting by ground waves, etc. The present invention may be applied to all digital video broadcasting by the OMA-BCAST.

2. Description of the Related Art

Conventionally, when providing paid content through Digital Video Broadcasting (DVB), diverse DRM techniques for enabling only users who have purchased content to use the content have been applied. In most cases, such content is encrypted prior to transmission. Broadcasting content is transmitted in the form of an Internet Protocol (IP) packet at the lowest layer, and this IP packet is encrypted by an IP Security (IPSec) method using a Traffic Encryption Key (TEK). If content data encrypted with TEK in the form of a stream is provided to a DVB receiving terminal, TEK lifetime information set in accordance with a user's content purchase request is added to each data of the content encrypted with TEK. If a time according to the TEK lifetime elapses after the content is played, the content is deleted from a storage of the TEK DVB receiving terminal to manage the digital rights. This IPSec method requires a construction for setting TEK lifetime information in TEK data of the content and operating the TEK lifetime with a timer.

According to this method, however, a temporal gap between time points of the conversion of one TEK data and the conversion of the next TEK data, i.e., a crypto period, may occur. This crypto period is generally set to be longer than the TEK lifetime of the TEK data in consideration of a network delay. However, in order to prevent the cutoff of the broadcasting due to such a network delay, the TEK lifetime should be set to be longer than the TEK lifetime to be originally set. For reference, in the OMA-BCAST standard, it is recommended to set the TEK lifetime to be three times the TEK lifetime to be originally set.

Also, a content provider, in order to overcome the cutoff of the broadcasting due to the playback termination of the current TEK data, transmits, in advance, the next TEK data to the digital video broadcast receiving terminal.

As described above, a user can further view the purchased content or even non-purchased content as long as the TEK lifetime is set to have a margin extending even after the expiration of the content use or as long as the TEK data provided in advance. This is called a sneak post view problem. This sneak post view problem becomes more serious in pay-per-view type services. For example, a whole broadcasting program that has not actually been purchased, may be viewed anyway due to the long TEK lifetime.

It is assumed that the TEK data of the content having a long crypto period is received in the DVB receiving terminal. In this case, if the next TEK data is not received when the playback of the TEK data expires, the playback of the content is cut off to prevent successive playback of the stream. Accordingly, the content provider further lengthens the lifetime of the TEK data to prevent the cutoff of the broadcasting, or even transmits the next TEK data. As a result, the user may continue to view the paid stream for as much as the TEK lifetime provided to have a margin, even if the rights object for the user's content expires or until the next TEK data.

As described above, the intention to solve the network delay causes a new problem regarding the sneak post view.

SUMMARY OF THE INVENTION

Accordingly, the present invention has been designed to solve the above and other problems occurring in the prior art, and provides a system and method for Digital Rights. Management (DRM) of Digital Video Broadcasting (DVB). Specifically, the present invention provides a system and method for DRM that solves a sneak post view problem.

In addition, the present invention provides a system and method for DRM of DVB, which can solve the sneak post view problem using the existing user's rights object for content and security association database, without adding a separate construction for managing the TEK lifetime.

In order to accomplish the above and other aspects, there is provided a system for DRM of DVB, according to the present invention, which includes a digital video broadcast transmitting device for transmitting content for the DVB and information on user's rights object for the content; and a digital video broadcast receiving device for receiving and storing the transmitted content, and playing the stored data in accordance with the information on the user's rights object.

In accordance with another aspect of the present invention, there is provided a method for DRM of DVB, which includes transmitting content for the DVB and information on user's rights object for the content from a digital video broadcast transmitting device to a digital video broadcast receiving device; storing data for the DVB in a Security Association Data Base (SADB) of the digital video broadcast receiving device; and reading out and playing the content stored in the SADB in accordance with the received information on the rights object.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Exemplary embodiments of the present invention will be described in detail hereinafter with reference to the accompanying drawings. In this disclosure, specific matters, such as particular traffic, travel, or weather information services, are exemplified for better understanding of the present invention, but it would be apparent to those of ordinary skill in the art that the present invention can be accomplished without the above specific matters. Also, when a detailed description of the operation or construction of the prior art related to the present invention may obscure the present invention, the detailed description will be omitted in this disclosure.

Figure 1:
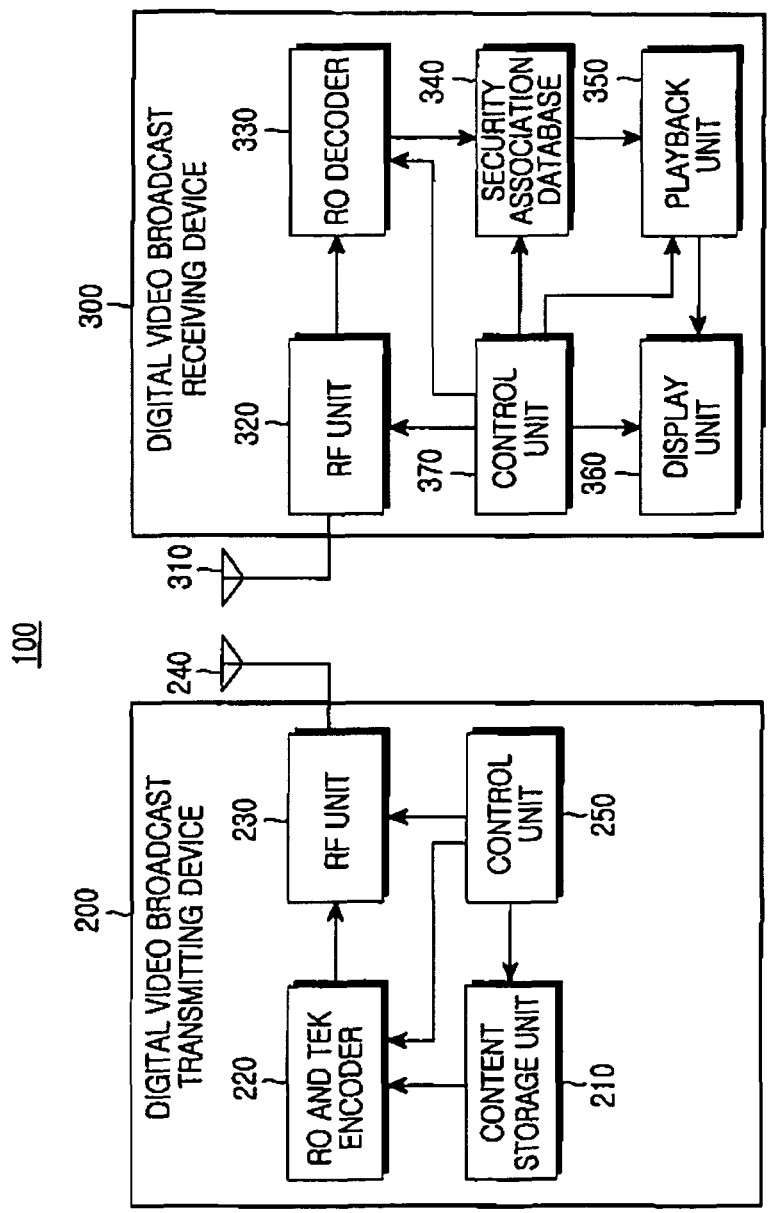
FIG. 1 is a block diagram illustrating a system for digital rights management of digital video broadcasting according to an embodiment of the present invention.

FIG. 1 is a block diagram illustrating a system for Digital Rights Management (DRM) of Digital Video Broadcasting (DVB) according to an embodiment of the present invention.

Referring to FIG. 1, the system 100 for DRM of DVB includes a DVB transmitting device 200 and a DVB receiving device 300. More specifically, the DVB transmitting device 200 includes a content storage unit 210, a Rights Object (RO) and Traffic Encryption Key (TEK) encoder 220, an RF unit 230, an antenna 240, and a control unit 250. The DVB receiving device 300 includes an antenna 310, an RF unit 320, an RO decoder 330, a security association database 340, a playback unit 350, a display unit 360, and a control unit 370.

The DVB transmitting device 200 broadcasts content for DVB. The DVB may be any one of DVB-H, DVB-C, DVB-S, and DVB-T according to the OMA-BCAST standards. In accordance with the above-described DVB type, the construction of the DVB transmitting device 200 is properly modified.

The digital video broadcast transmitting device 200 includes the content storage unit 210, which may also be separate from the device. The content storage unit 210 stores content for DVB with a storage type to suit the standard technology.

The content stored in the content storage unit 210 is encrypted for the DVB. In FIG. 1, the RO and TEK encoder 220 for encrypting the content using TEK is illustrated. However, the RO and TEK encoder 220 may be replaced by an encoder encrypting the content using another encryption key. The RO and TEK encoder 220 may encrypt the whole content into one TEK data, or may encrypt the content into various TEK data.

The TEK data encrypted with TEK includes a Security Parameter Index (SPI), encrypted content, and TEK lifetime information. The SPI and the TEK lifetime information are used as Security Association (SA) information for playing the content in the DVB receiving device 300 that receives the TEK data. In addition, TEK information, such as the SA information for playing the content in the DVB receiving device 300 and IP information of the DVB transmitting device 200 and the DVB receiving device 300 are also transmitted to the DVB receiving device 300. Details of the SPI and TEK lifetime information will be described later in association with the description of the DVB receiving device 300.

The RO and TEK encoder 220 encrypts the TEK-encrypted content with another encryption key. This is to give the rights object for the content only to a user who purchased the content, and thus only the user who received the encryption key can play and view the content. The concept of rights object is based on the DRM. Diverse encryption keys may be used as the encryption key for rights object (hereinafter referred to as an "RO key"). Of course, the RO and TEK encoder 220 may be divided into a construction for encryption by the RO key and a construction for encryption by the TEK.

The RF unit 230 converts the content encrypted with the TEK and RO key into an analog signal so that the content can be transmitted in accordance with diverse DVB transmission methods. The content as converted above is output through the antenna and is transmitted to the DVB receiving device 300. In the case of DVB-C, the content is output through a cable, and thus the antenna 240 is not required.

The analog signal is transmitted through a DVB channel, which may be divided into four layers. Herein below, a DVB channel will be described in more detail.

A first layer of the DVB channel is for terminal authentication of the DVB receiving terminal (in the present invention, the DVB receiving device 300), and through the first layer, data for the terminal authentication is transmitted/received. A second layer is for transmitting the data encrypted with the RO key in order to give the user's rights object for specified content. A third layer is for the data of the TEK-encrypted content itself. A fourth layer is for non-encrypted data before the TEK data. In addition to the encrypted content, security association information for decrypting the encrypted content is also transmitted through a channel. The security parameter index, the RO key, the TEK lifetime information, the TEK information, etc., are transmitted as the security association information.

The control unit 250 controls the operation of the above-described constituent elements.

The DVB receiving device 300 receives the content, which is input through the DVB channel, through the antenna 310. The RF unit 320 converts the received content into a digital signal. In the case of DVB-C, the content is input through a cable, and thus the antenna 310 is not required.

Thereafter, the RO decoder 330 decodes the converted signal. Using the separately received RO key and the TEK, the encrypted content data is decrypted in order. First, the authentication of the DVB receiving device 300 is made. That is, it is authenticated whether the DVB receiving device 300 is the DVB receiving device of the user who purchased the content. In authenticating the device, diverse existing authentication methods may be used. Thereafter, when it is authenticated that the user is the user who purchased the content, the encrypted content is decrypted using the RO key received when the content is purchased. Accordingly, the user's rights object for the purchased content is authenticated.

After the received content data is decrypted by the RO key, the TEK data encrypted with the TEK, the security parameter index added thereto, and the TEK lifetime information of the TEK information remain. The encrypted TEK data, the security parameter index, and the TEK lifetime information are stored in the security association database 340. The security association database 340 may be implemented by a separate memory, or a part of a memory basically used in the DVB receiving device 300 may be used as the security association database 340.

The authentication of the user's rights object is an important aspect of the present invention. In accordance with the user's rights object, the access right on the security association database 340 is determined. Generally, a user may purchase the content itself, or may purchase the content by time. In this case, if the time purchased by the user expires, the rights object for the user's content also expires, so that the access right on the security association database expires. With the above-described construction, the sneak post view problem, which occurs due to the TEK data having the TEK lifetime set to be longer than it needs or the TEK data excessively received in advance even without purchasing it, can be solved. That is, even if the purchased TEK data has a TEK lifetime longer than it needs, or non-purchased TEK data is stored in the security association database 340, the access of the security association database 340 itself is controlled in accordance with the user's rights object to solve the conventional problems.

For example, the access right on the security association database 340 is given by toggling a corresponding flag between "1" and "0". However, even if the user's rights object expires, the user may re-purchase the content in order to re-determine the access right on the security association database 340. In this case, a process of re-receiving the TEK data already received can be omitted.

The playback unit 350 plays the content using the security parameter index, the TEK data, and the TEK lifetime information stored in the security association database 340. First, a security parameter index stored in the security association database 340, which coincides with the separately received security parameter index, is searched for. Then, the TEK data corresponding to the stored security parameter index is read out, and then the TEK data is decrypted using the separately received TEK. Accordingly, completely decrypted content data is obtained, such that the content is displayed on the display unit 360.

For example, the display unit 360 may be implemented by a Plasma Display Panel (PDP), a Liquid Crystal Display (LCD), etc., in accordance with the type of the DVB receiving device 300. Of course, a separate display device, which is not the DVB receiving device 300, may also be used to display the content.

The control unit 340 controls the whole operation of the above-described constituent elements.

Figure 2:
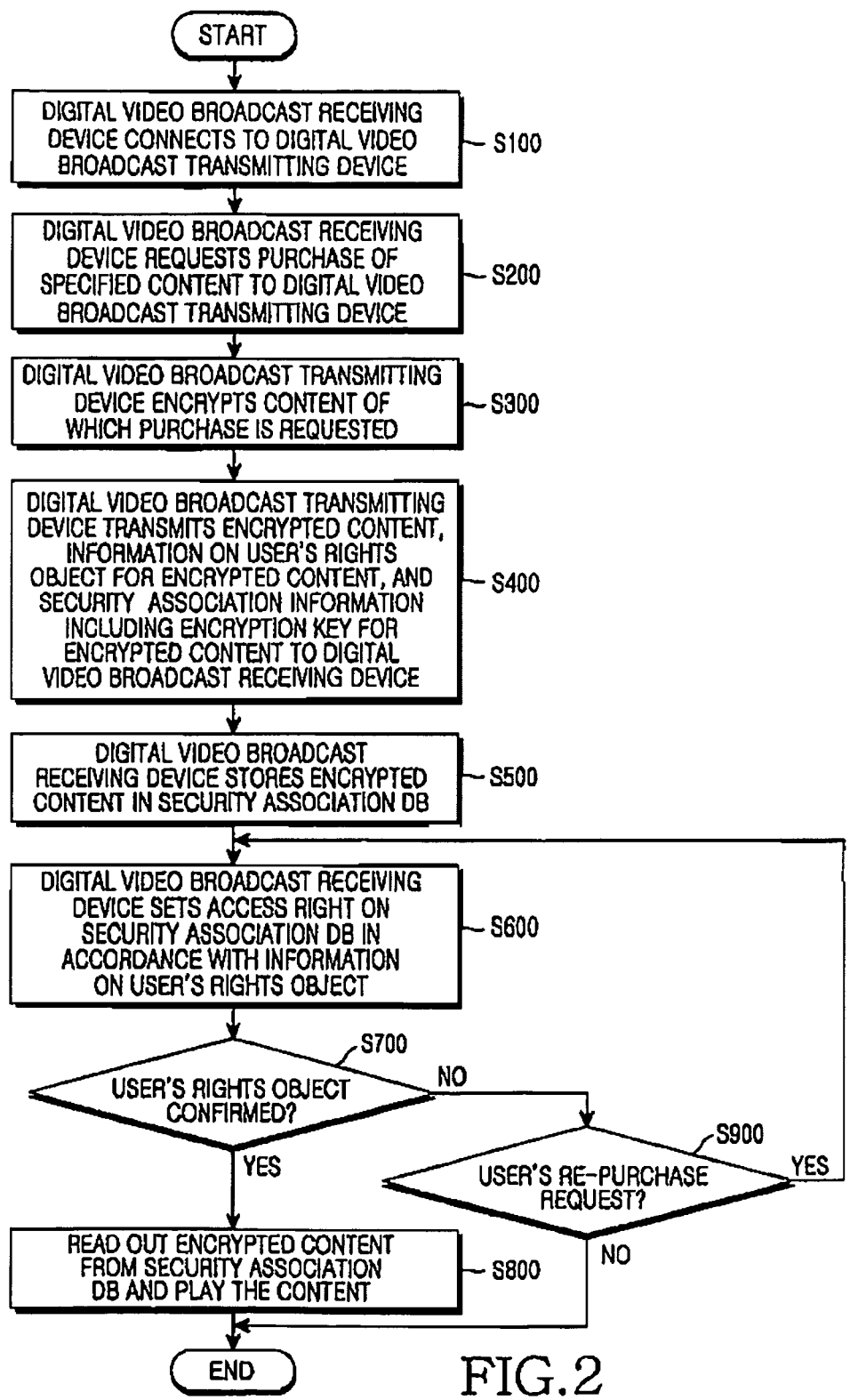
FIG. 2 is a flowchart illustrating a method for digital rights management of digital video broadcasting according to an embodiment of the present invention.

FIG. 2 is a flowchart illustrating a method for DRM of DVB according to an embodiment of the present invention.

Referring to FIG. 2, the DVB receiving device 300 connects to the DVB transmitting device 200 in accordance with a user's request in step S100. Here, the user performs an authentication procedure for the user's digital video broadcast receiving device 300 itself. Then, the digital video broadcast receiving device 300 requests a purchase of specified content desired by the user from the DVB transmitting device 200, and purchases the content in step S200.

After purchasing the content, the DVB transmitting device 200 encrypts the purchased content with the TEK in step S300. Here, the digital video broadcast transmitting device 200 adds the security parameter index and the TEK lifetime information, which are required when the DVB receiving device 300 decrypts the TEK data, to the TEK data, and encrypts the TEK data, the corresponding security parameter index, and the TEK lifetime information with the RO key at the same time. The RO key, as described above with reference to FIG. 1, is an encryption key for authenticating the user's rights object for the content.

The DVB transmitting device 200 transmits the respective TEK data encrypted with the RO key to the DVB receiving device 300 in step S400. The DVB transmitting device 200 also transmits the RO key to the DVB receiving device 300.

In this case, the user may transmit the security association information together so that the content can be played in the DVB receiving device 300. The security association information may include the Security Parameter Index (SPI), IP information of the DVB transmitting device 200 and the DVB device 300, and the TEK information, which are used to authenticate the user's rights object and the decryption of the transmitted content data.

The DVB receiving device 300 authenticates the rights object for the encrypted content data received from the DVB transmitting device 200, and stores the authenticated rights object in the security association database 340 in step S500.

The authentication of the rights object is performed by decrypting the received content data with the RO key separately received. Accordingly, in the security association database 340, the content data encrypted with the TEK is stored as the content data decrypted with the RO key.

The DVB receiving device 300 sets the access right on the security association database 300 in accordance with the information on the user's rights object in step S600. The access right is an access right on the security association database 340. For example, if the user's rights object is set in terms of time, the access right may also be set as time information corresponding to the user's rights object. For example, the access right controls whether to access the content itself by toggling a flag between "1" and "0", which indicates the access right depending on whether the rights object for the content stored in the security association database 340 exists. Accordingly, reading of the content which is pre-stored in the security association database 340 without being actually purchased, or the content of which the TEK lifetime set to be longer than the TEK lifetime actually required has not yet expired is prevented, and thus the above-described sneak post view problem can be solved.

If the user sends a command for playing the purchased content to the DVB receiving device 200, the DVB receiving device 200 inquires whether the user's access right on the corresponding content has been confirmed in step S700. If the user's access right has been confirmed, the digital video broadcast receiving device 300 reads the TEK data to which the security parameter index coinciding with the security parameter index separately received is added, among the TEK data stored in the security association database 340, and decrypts the TEK data with the TEK separately received.

The playback unit 350 plays the decrypted TEK data, and the display unit 360 displays the decrypted content data in step S800. If the user's access right on the content that the user intends to play has not been confirmed in step S700, and the user does not request a re-purchase of the content, the DVB receiving device refuses the playback of the content and terminates its operation. However, if the user request the re-purchase of the content, the DVB receiving device plays and displays the content by re-performing the above-described steps including the step S600 for re-determining the access right on the corresponding content.

As described above, according to the present invention, the sneak post view problem occurring during the DVB can be solved, and thus the digital rights for the DVB content can be efficiently protected. In solving the sneak post view problem, the existing rights object and the construction of the security association database can be used, without adding a separate construction for managing the TEK lifetime.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A system for Digital Rights Management (DRM) of Digital Video Broadcasting (DVB), comprising:
    a digital video broadcast transmitting device configured to transmit content for the DVB and information on a user rights object for the content; and
    a Rights Object (RO) decoder configured to decode the transmitted content using an RO key and a Traffic Encryption Key (TEK);
    a digital video broadcast receiving device configured to receive and store the transmitted content, including the RO key and the TEK, in a Security Association DataBase (SADB), and play the stored data in accordance with the information on the user rights object, and a control unit configured to control the SADB in accordance with the user rights object received from the digital video broadcast transmitting device, wherein the information on the user rights object is associated with an access right on the SADB.

2. The system of claim 1, wherein the DVB comprises one of Digital Video Broadcasting-Handheld (DVB-H), Digital Video Broadcasting-Cable (DVB-C), Digital Video Broadcasting-Satellite (DVB-S), and Digital Video Broadcasting-Terrestrial (DVB-T).

3. The system of claim 1, wherein the digital video broadcast receiving device comprises:

the SADB configured to store the content received from the digital video broadcast transmitting device.

4. The system of claim 1, wherein whether to read out data from the SADB is controlled in accordance with the user rights object.

5. The system as claimed in claim 1, wherein whether to read out data from the SADB is controlled by setting a flag for the access right on the SADB itself.

6. The system as claimed in claim 1, wherein the digital video broadcast transmitting device transmits data encrypted by the TEK.

7. The system as claimed in claim 6, wherein the digital video broadcast transmitting device transmits a Security Parameter Index (SPI), Internet Protocol (IP) information of the digital video broadcast transmitting device and the digital video broadcast receiving device, TEK information, and TEK lifetime information, as Security Association (SA) related information.

8. The system as claimed in claim 7, wherein the content is decrypted using the SPI and the TEK information.

9. A method for Digital Rights Management (DRM) of Digital Video Broadcasting (DVB), comprising:

transmitting content for the DVB and information on a user rights object for the content from a digital video broadcast transmitting device to a digital video broadcast receiving device;

decoding, by a Rights Object (RO) decoder, the transmitted content using an RO key and a Traffic Encryption Key (TEK);

storing data, including the RO key and the TEK, for the DVB in a Security Association DataBase (SADB) of the digital video broadcast receiving device;

controlling, by a control unit, the SADB in accordance with the user rights object received from the digital video broadcast transmitting device;

reading out the content stored in the SADB in accordance with the received information on the rights object; and playing the read out content, wherein the information on the user rights object is associated with an access right on the SADB.

10. The method of claim 9, wherein the Digital Video Broadcasting includes any one of Digital Video Broadcasting-Handheld (DVB-H), Digital Video Broadcasting-Cable (DVB-C), Digital Video Broadcasting-Satellite (DVB-S), and Digital Video Broadcasting-Terrestrial (DVB-T).

11. The method of claim 9, wherein reading out the content stored in the SADB in accordance with the received information on the rights object comprises:

setting the access right on the SADB in accordance with the received information on the user rights object; and reading out data stored in the SADB in accordance with the set access right.

12. The method of claim 11, wherein when the user rights object is a rights object for a specified time, the access right is set in accordance with the specified time.

13. The method of claim 9, wherein transmitting content for the DVB and the information on the user rights object for the content from the digital video broadcast transmitting device to the digital video broadcast receiving device comprises:

encrypting, by the digital video broadcast transmitting device, the content for the DVB with the TEK; and transmitting the encrypted content to the digital video broadcast receiving device.

14. The method of claim 9, wherein transmitting content for the DVB and the information on the user rights object for the content from the digital video broadcast transmitting device to the digital video broadcast receiving device further comprises:

transmitting, by the digital video broadcast transmitting device, a Security Parameter Index (SPI), Internet Protocol (IP) information of the digital video broadcast transmitting device and the digital video broadcast receiving device, TEK information, and TEK lifetime information, as Security Association (SA) related information.

15. The method of claim 14, wherein reading out the content stored in the SADB in accordance with the received information on the rights object comprises decrypting data stored in the SADB using the SPI and the TEK information.

16. The method of claim 15, wherein playing the read out content comprises playing the decrypted data.

17. A digital video broadcast receiving device for receiving content for Digital Video Broadcasting (DVB), comprising:

a Radio Frequency (RF) unit configured to receive content, including a Rights Object (RO) key and a Traffic Encryption Key (TEK), for the DVB and information on a user rights object for the content;

a Security Association DataBase (SADB) configured to store the received content;

an RO decoder configured to decode the received content using the RO key and the TEK;

a playback unit configured to play the stored data in accordance with the information on the user rights object; and a control unit configured to control the SADB in accordance with the user rights object received from a digital video broadcast transmitting device, wherein the information on the user rights is associated with the access right on the SADB.

18. A method for Digital Rights Management (DRM) of Digital Video Broadcasting (DVB), comprising:

receiving content, including an Rights Object (RO) key and a Traffic Encryption Key (TEK), for the DVB and information on a user rights object for the content;

storing the received content in a Security Association DataBase (SADB);

decoding the received content using the RO key and the TEK;

controlling the SADB in accordance with the user rights object received from the digital video broadcast transmitting device; and playing the stored data in accordance with the information on the user rights object, wherein the information on the user rights is associated with the access right on the SADB.

\* \* \* \* \*